June 26, 1951 — L. S. MARANZ — 2,558,449

FREEZER

Filed July 23, 1949

INVENTOR.
LEO S. MARANZ
BY
Maurice Cayn
ATTY.

Patented June 26, 1951

2,558,449

UNITED STATES PATENT OFFICE 2,558,449

FREEZER

Leo S. Maranz, Chicago, Ill., assignor to Freeze King Corporation, Chicago, Ill., a corporation of Illinois Application July 23, 1949, Serial No. 106,410

7 Claims. (Cl. 259—64)

The invention relates to improvements in freezers of a kind used to freeze and dispense frozen custards, soft ice cream, frozen malts, etc., and more particularly to the novel construction of the freezing chamber and associated mechanism contained therein.

The freezer embodying the present invention is of a type shown in my co-pending application Serial No. 93,984, filed May 18, 1949, now Patent No. 2,515,722, issued July 18, 1950. This type freezer includes means to convey a measured flow of refrigerated, substantially fluid custards, malts or ice cream, etc., commonly referred to as "mix," into a freezing chamber in which it is congealed and then dispensed in desired quantities. Although the structure disclosed in the aforesaid co-pending application is effective to prevent any material quantity of "mix" from flowing out of the vending discharge without having been aerated and sufficiently congealed in the freezing chamber, there are occasions, especially under conditions of fast withdrawals, when small quantities of such "mix" work their way to the discharge and are dispensed.

The present invention overcomes this objectionable characteristic in the freezer discussed hereinabove due to the provision of novel means in the freezing chamber to prevent the flow of "mix" to the discharge. It is, therefore, an object of the present invention to provide a freezer with novel means to prevent the passage of refrigerated, substantially fluid "mix" from its point of delivery into the freezing chamber to the vending discharge.

Another object is to provide a freezer with a novelly constructed compartmented freezing chamber.

Another object is to provide a freezer having a compartmented freezing chamber provided with novelly constructed beater mechanism and novel means to convey "mix" into one of said compartments for subsequent delivery into the other compartment prior to being vended.

Another object is to provide a freezing chamber of the kind referred to with novel, easily assembled or disassembled means dividing said chamber into compartments and novel conveyor and beater mechanisms which are easy to assemble and disassemble for purposes of sanitation.

Other objects of the invention will appear from the following description and accompanying drawing and will be pointed out in the annexed claims.

In the accompanying drawing there has been disclosed a structure designed to carry out the various objects of the invention, but it is to be understood that the invention is not confined to the exact features shown as various changes may be made within the scope of the claims which follow.

In the drawing:

Fig. 1 is a longitudinal vertical sectional view of the freezing mechanism of a freezer for frozen custards and the like.

Figure 1:
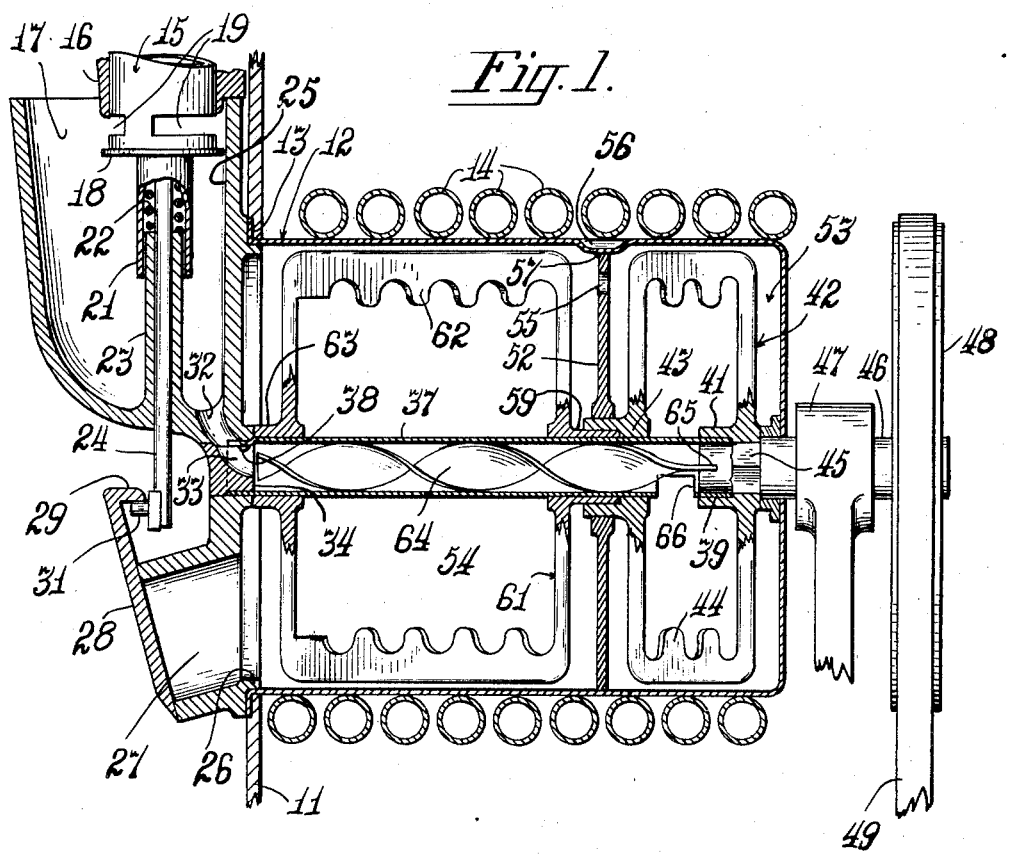
Figure 2:
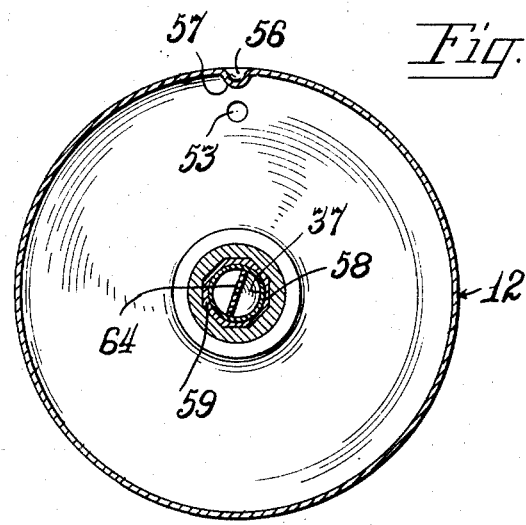
Fig. 2 is a transverse sectional view of the freezing chamber, taken along the front side of the partition.

Referring to the accompanying drawing, which illustrates but a part of a complete freezer embodying the features of the present invention, the freezing chamber is contained in a suitable cabinet including a front wall 11. The front wall 11 is provided with an opening in which the forward end of a freezing chamber 12 is mounted. As shown, the freezing chamber 12 consists of a horizontally disposed tubular shell closed at its rear end and preferably flanged externally at its front end, as at 13, to provide means for securing it, as by welding, to the front wall. The freezing chamber 12 has a refrigerant coil 14 arranged therearound and suitably connected with a refrigerating apparatus of any conventional construction.

Means is provided on the front wall 11 to effect delivery of measured quantities of "mix" to the freezing chamber, which means will be described in detail presently. The "mix" constitutes a substantially fluid substance of the character to be dispensed in the form of a substantially frozen, relatively firm product. Preferably, the "mix" is initially passed through a refrigerating chamber, of a kind shown in my co-pending application aforesaid, from where it flows into a passageway for delivery in measured quantities to the freezing chamber in a manner to be described presently. Inasmuch as the refrigerating chamber does not constitute a part of the present invention, it has not been disclosed. It is sufficient to note that the refrigerated "mix" is delivered into the region of a vertically reciprocal measuring valve 15 mounted in a tubular neck portion 16 carried on the upper end of a feed hopper 17.

The valve structure consists of a cylinder having a closure plate 18 at its lower end and a pair of circumferentially arranged slots 19 closely adjacent thereto. A similar closure plate and slots are provided at the upper end of the cylinder. In operation, the cylinder is adapted to receive, through the slots at the upper end thereof, a sufficient quantity of "mix" to substantially fill the same, while in its uppermost position of adjustment. The "mix" contained in the valve 15 is discharged into the hopper 17 through slots 19 when said valve is moved into its lowered position, as illustrated. When the valve is in this position, the slots at its upper end are carried into the tubular neck 16 to cut off the flow of "mix" thereto. The valve 15 is adapted to be raised and lowered at selected intervals, in a manner to be described hereinafter, so that each time the valve is reciprocated through one operating cycle a measured quantity of refrigerated "mix" is delivered to the feed hopper 17.

Operation of the valve 15 is accomplished automatically and it accordingly is provided on the lower side of its bottom plate 18 with a depending sleeve 21 of lesser diameter than the valve 15. This sleeve receives therein a compression spring 22, the upper end of which bears against the bottom of the plate 18 and the lower end of which rests upon the upper end of a hollow column 23. The column 23 is integral with the bottom wall of the feed hopper 17 and a passage is provided therethrough to receive a slidable plunger 24 freely therein. The plunger 24 has its upper end secured in any suitable manner to the bottom plate 18 of the valve 15 and its lower end depends through and beyond the bottom of the feed hopper as shown.

The feed hopper 17 preferably is integrally formed on the front face of a plate-like member 25 having a rearwardly extending circular flange 26 that fits snugly within the open end of the freezing chamber 12. The wall 25 is provided with a vending discharge spout 27 located in the area of the lowermost point of the freezing chamber. The vending discharge spout 27 preferably is substantially of large diameter and it communicates at one end directly with the interior front end of the freezing chamber 12. Its other or discharge end is suitably machined on its face to receive in sliding association therewith a knife gate 28 which may be of any conventional construction such, for example, as is illustrated in my aforesaid co-pending application and in an application of Woodruff, Serial No. 52,933, filed October 5, 1948, now Patent No. 2,523,853, issued September 26, 1950. Briefly, the gate 28 is pivotally mounted at one end to the discharge spout 27 and it has a portion thereof extending upwardly beyond the upper periphery of the spout suitably formed on its upper edge with a rearwardly extending flange 29. The flange 29 cooperates with a laterally projecting roller 31 carried on the lower end of the plunger 24.

In the operation of the device, insofar as it has been described hereinabove, the gate 28 is adapted to be moved upwardly into an open position to vend a desired quantity of frozen "mix" from the freezing chamber 12 after which it is returned to its closed position. The manner in which the "mix" enters the freezing chamber from the feed hopper will receive consideration hereinafter. Each time the gate 28 is moved into open position, the flange 29 thereon is carried upwardly to thereby enable the spring 22 to urge the valve 15 into its uppermost position. While the valve is in this position, refrigerated "mix" enters the same as described hereinbefore. The capacity of the valve 15 is equal to the volume of frozen "mix" discharged when the discharge gate is opened. When the gate is moved down into closed position, the flange 29 engages the roller 31 and carries the plunger 24 and valve 15 into their lowermost positions illustrated. As a consequence, a measured quantity of refrigerated "mix" corresponding to the amount of frozen "mix" discharged is delivered to the feed hopper 17 each time the gate is operated. This is what is commonly termed a continuous-flow feed mechanism and it will become apparent as the description proceeds that any other means, including manual, may be utilized to maintain a supply of "mix" in the feed hopper 17.

"Mix" delivered to the hopper 17 is conveyed into the freezing chamber 13 in such manner as to be delivered to the closed rear end portion thereof. As illustrated, the "mix" flows from the feed hopper 17 through an orifice 32 in the bottom wall thereof. The orifice 32 communicates at its lower end with a channel 33 formed in a plug 34 firmly secured in and extending rearwardly from the wall 25. The rearwardly projecting end of the plug 34 constitutes a boss on the inside face of the wall 25. Obviously, the wall could be formed with an integral boss in lieu of the plug 34 but it preferably is provided as a separate plug insert to present a hardened bearing for a beater assembly to be described presently. The boss or plug 34 is suitably turned down adjacent its free end to provide a diameter less than the diameter of said plug.

A tube 37 is telescoped loosely over the reduced diameter of the plug 34 and it may be provided with a detent 38, as best shown in Fig. 1, coincident with the channel 33 to prevent its rotation relative to the plug 34. The other or rear end of the tube 37 is loosely seated in a recess 39 formed on the inside face of a hub 41 of a beater element 42. This beater may be of any suitable construction. However, it is preferred that it include the hub 41 and a similar opposed hub 43 in coaxial alignment therewith. The hub 43 is journalled for free rotation on the tube 37. Interconnecting fingered webs 44 bridge the gap between the hubs 41 and 43 and are located in close proximity to the inside surface of the cylindrical wall of the freezing chamber 12.

The beater hub 41 has a squared opening to receive the squared end 45 of a shaft 46 which may be journalled, for example, in a journal block 47. A pulley 48 is fixedly secured to the shaft 46 to receive trained thereover a driven belt 49. Upon operation of the belt 49, during operation of the freezer, the shaft 46 is rotated to rotate therewith the beater 42.

Upon referring to Fig. 1, it will be noted that the beater 42 is short as compared with the overall length of the freezing chamber. As a consequence, its forward hub 43 extends through and is freely journalled in a circular partition wall 52 arranged within the freezing chamber. The wall 52 divides the freezing chamber into rear compartment 53 and a front compartment 54 and is imperforated except for the provision of a small hole 55 provided in the uppermost segment thereof closely adjacent to the top wall portion of the freezing chamber 12. Rotation, or other displacement of the partition 52, is prevented by striking a detent 56 in the chamber wall, which detent nests snugly in a peripheral recess 57 on the partition. In addition to preventing displacement of the partition 52, the detent 56 also affords means whereby, during assembly, the partition may be properly positioned within the freezing chamber with its hole 55 properly located relative thereto.

The hub 43 is provided with a non-circular recess 58, which in the present instance is octagonal, adapted to receive a similarly shaped rearwardly extending hub 59 provided on a second beater 61. The beater 61 is constructed substantially like the beater 42 and includes fingered webs 62 and a forwardly located hub 63. Both hubs 59 and 63 are freely journalled upon the tube 37 so as to be freely rotatable independently thereof. It should be quite evident at this time that upon rotation of the shaft 46 both beaters are rotated in unison so as to agitate and aerate the contents of both compartments.

In order to facilitate the flow of "mix" through the tube 37, suitable means is provided, preferably in the form of a feed screw 64. As shown, the screw 64 is substantially coextensive with the length of the tube 37 and it has its rearmost end engaged in a slot 65 provided in the end of the squared drive shaft portion 45. The construction is such that "mix" deposited in the hopper 17 flows through the hopper orifice 32 into the tube 37. The "mix" is then forcibly conveyed by the screw 64 longitudinally of the tube and is discharged at the rear end thereof through an opening 66 provided in said tube. "Mix" leaving the opening 66 enters the rear compartment 53 and is substantially congealed before being forced through the hole 55 in the partition 52 into the forward compartment 54.

Inasmuch as the partially frozen "mix" enters the forward compartment of the freezing chamber at the rear end thereof, such "mix" must travel the entire length of the chamber before it reaches the vending discharge spout 27. As a result of this delayed delivery of newly admitted, substantially fluid "mix" to the vending discharge spout, such "mix" is properly congealed or frozen before its discharge. It obviously is exceedingly improbable that substantially fluid "mix" will find its way through the partition wall hole 55 into the forward compartment and ultimately be discharged. As a result, all "mix" delivered to the freezing chamber is properly congealed or frozen before being vended.

The entire assembly described hereinabove is easily and quickly assembled and dis-assembled. When the apparatus, assembled in the manner illustrated in Fig. 1, is to be dis-assembled for cleaning, the front plate 25 is removed from the cabinet. The beater assemblies and the interposed partition 52, as well as the tube 37, then are withdrawn as a unit through the open front end of the freezing chamber. This sub-assembly may be then dis-assembled by withdrawing the tube 37 from the beaters whereupon the beaters may be separated one from the other and from the partition. The feed screw 62 likewise is easily and quickly dis-associated from the squared drive-shaft portion 45. To re-assemble, the parts are replaced in substantially the reverse chronological order.

Although an exemplary form of construction and assembly has been shown in the accompanying drawings and described in detail hereinabove, it should be understood that the novel construction of the compartmented freezing chamber and the beater assembly contained therein may be incorporated in freezers constructed in a manner different from that illustrated and may embody various modifications in detail construction without departing from the spirit of the invention or the scope of the appended claims.

I claim:

1. In a machine for dispensing frozen custards or the like including a freezing chamber closed at its rear end and having at its front end a closure provided with an inlet for a non-frozen "mix" and a controlled vending discharge for said "mix" after it is frozen, a partition wall dividing the chamber into front and rear compartments, a driven shaft extending through the rear chamber wall into the rear compartment, a beater mounted in the rear compartment rotatable with and having a hub mounted on said shaft, a second hub on said beater co-axial with and spaced from the first hub, a co-axial non-circular seat in said last mentioned hub, a beater mounted in the other compartment having one of its hubs seated in said non-circular seat whereby the two beaters will rotate in unison, a tube extending through said hubs and supported at one end by the closure so as to receive "mix" flowing through said inlet, said tube having an opening at its other end to discharge "mix" into the rear compartment, and the partition having a passageway therethrough to permit "mix" to pass from the rear into the front compartment.

2. In a machine of the kind recited in claim 1, in which a conveyor operates in the tube to convey the "mix" therethrough.

3. In a machine of the kind recited in claim 1, in which a conveyor screw is mounted in the tube and is operatively connected with the driven shaft.

4. In a machine of the kind recited in claim 1, in which the other hub on the last named beater is mounted on the tube.

5. In a machine for dispensing frozen custards or the like including a freezing chamber closed at its rear end and having at its front end a closure provided with an inlet for a non-frozen "mix" and a controlled vending discharge for said "mix" after it is frozen, a partition wall dividing the chamber into front and rear compartments, and means including a screw conveyor to convey non-frozen "mix" from the inlet into the rear compartment, said partition having an opening to permit partially frozen "mix" to pass into the front compartment for subsequent discharge through said vending discharge.

6. In a machine for dispensing frozen custards or the like including a freezing chamber closed at its rear end and having at its front end a closure provided with an inlet for a non-frozen "mix" and a controlled vending discharge for said "mix" after it is frozen, a partition wall dividing the chamber into front and rear compartments, and means including a tube having a screw conveyor therein to convey non-frozen "mix" from the inlet into the rear compartment, said partition having an opening to permit partially frozen "mix" to pass into the front compartment for subsequent discharge through said vending discharge.

7. In a machine for dispensing frozen custards or the like including a cylindrical freezing chamber closed at its rear end and having at its front end a closure provided with an inlet for a non-frozen "mix" and a controlled vending discharge for said "mix" after it is frozen, a partition having a circumference corresponding substantially to the inside circumference of the chamber dividing the chamber into front and rear compartments, means to prevent rotation of said partition, and means to convey non-frozen "mix" from the inlet into the rear compartment, said partition having an opening to permit partially frozen "mix" to pass into the front compartment for subsequent discharge through said vending discharge.

LEO S. MARANZ.

REFERENCES CITED

The following references are of record in the file of this patent:

UNITED STATES PATENTS

| Number | Name | Date |
|---|---|---|
| 797,512 | Glauser | Aug. 15, 1905 |
| 970,369 | Greaves | Sept. 13, 1910 |
| 1,113,807 | Meisenhelter | Oct. 13, 1914 |
| 2,361,035 | Klaasen | Oct. 24, 1944 |